UNITED STATES PATENT OFFICE.

EMERY E. CHILDS, OF BROOKLYN, NEW YORK.

PREPARATION OF CASEINE AND OF ARTICLES MADE THEREFROM.

SPECIFICATION forming part of Letters Patent No. 307,269, dated October 28, 1884.

Application filed August 18, 1884. (No specimens.)

*To all whom it may concern:*

Be it known that I, EMERY E. CHILDS, of Brooklyn, in the county of Kings and State of New York, have invented new and useful Improvements in the Preparation of Caseine and of Articles Made Therefrom, of which the following is a full, clear, and exact description.

This invention has for its object the production of a cheap and superior quality of caseine from milk-curd direct, said product to be used in the manufacture of various useful and ornamental articles.

The invention consists in a novel process of producing the caseine and in the product as obtained by said process, substantially as hereinafter described.

This invention differs from another invention of mine for the same purpose in taking the milk-curd after it has been separated from the whey, but before the water has been pressed out of it, or only very partially so at least, and working or kneading such naturally-saturated curd in its own water, with or without additional water, at a comparatively low temperature and below the boiling-point, such curd having first been reduced to a fragmentary condition and the fatty or other objectionable matters mainly washed out of or eliminated from it instead of, as in my previous invention, extracting or preparing the caseine from milk-curd or cheese mainly or wholly free from its water of saturation by working or kneading the mass in water at or near the boiling-point and eliminating the fatty or other objectionable matters from it. By retaining the water of saturation in the curd in a sufficient quantity to admit of the working or kneading of the curd, which water naturally permeates the mass much more thoroughly as regards its several particles than artificially supplying water to knead it can do, I am not only enabled to work or knead the curd at a much lower temperature and more economically and to produce a tougher article of caseine, but when it is desired to incorporate with the caseine coloring or other ingredients the same may be done so soon as the curd has been washed free from fat, and the whole be worked or kneaded together instead of requiring a separate mixing operation of the coloring or other ingredients after the kneading process has been completed, as necessary where the curd is kneaded in boiling water. I take, for instance, skimmed milk, with or without salt and coloring-matter, and after coagulation separate the whey from the curd, but do not subject the curd to pressure, which will express the water of saturation from it, but take the wet curd, composed of caseine and water in about equal parts, more or less, and reduce the same to a fragmentary condition and wash or eliminate the fatty and other objectionable matter from it. I then heat the naturally-saturated curd to a temperature below the boiling point of water, and which may be from 125° to 175° Fahrenheit, more or less, varying the temperature according to the condition of the curd as it is developed in the process of manufacture. The moderately-heated and naturally-saturated curd I then work or knead for about fifteen minutes, more or less, the wet curd being sufficiently plastic to admit of such operation. This will leave the caseine in the condition of a tough and glutinous mass, and its preparation as described will not only be highly economical, but the caseine so produced will have a superior toughness. Said caseine may then be pressed into sheets or molds of any desired form, and will make a material much cheaper and superior to that made from caseine which has been treated with benzine, an alkali, acetic or other acid. If desired, coloring-matter or other ingredients, such as ground ivory, bone, porcelain, &c., may be mixed with the caseine, according to the article desired to be imitated or produced, and this by my improved process as hereinbefore described may be done so soon as the milk-curd has been washed free from fat, &c., and said ingredients be thoroughly mixed by and during the operation of kneading the curd, thus saving a distinct mixing operation, although, if desired, the coloring or other ingredients may be added to the curd after kneading, care, however, being taken to thoroughly mix the whole together. This process essentially differs from other processes of producing various compositions made up of caseine and emery, or other like gritty and coloring matters, and in which not only an alkali or acid is used, but in which, or others of which, a preparatory cooking at a low temperature is necessary, then the milk product allowed to cool, then mixed with various ingredients, and afterward said compound simply washed in boiling water.

The caseine prepared as I have herein described is designed to include various articles of ornament or use made of or from it, with or without other ingredients.

Having thus described my invention, what I claim as new, and desire to secure by Letters Patent, is—

1. The within-described process of extracting and preparing caseine from milk-curd, which consists in working or kneading the curd in its naturally-saturated condition at a temperature below the boiling-point of water until it reaches a tough and glutinous consistency, said curd having previously mainly eliminated from it fatty and other objectionable matters, substantially as specified.

2. In the within-described process of extracting and preparing caseine from milk-curd and incorporating therewith coloring or other ingredients, first washing and eliminating fatty and other objectionable matters from the curd while in its naturally-saturated condition, then adding the coloring or other ingredients, and afterward working or kneading the whole together at a temperature below the boiling-point of water, essentially as described.

3. Caseine prepared from milk-curd worked or kneaded in its naturally-saturated condition at a temperature below the boiling-point of water, substantially as specified.

4. Caseine prepared from milk-curd having washed or eliminated from it fatty and other objectionable matters and with or without the addition of other ingredients, worked or kneaded in its naturally-saturated condition at a temperature below the boiling-point of water, and afterward prepared or molded into shape, essentially as specified.

EMERY E. CHILDS.

Witnesses:
A. GREGORY,
C. SEDGWICK.